United States Patent
Yamamoto (10) Patent No.: US 7,805,996 B2
(45) Date of Patent: Oct. 5, 2010

(54) SERVO ACCELEROMETER

(75) Inventor: Shuichi Yamamoto, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 280 days.

(21) Appl. No.: 11/893,556

(22) Filed: Aug. 15, 2007

(65) Prior Publication Data

US 2008/0041158 A1    Feb. 21, 2008

(30) Foreign Application Priority Data

Aug. 16, 2006   (JP) .............................. 2006-221830

(51) Int. Cl.
*G01P 15/13* (2006.01)
(52) U.S. Cl. .................................. 73/514.21
(58) Field of Classification Search ............... 73/493, 73/514.18, 514.21, 514, 22, 514.23, 514.36, 73/514.37
See application file for complete search history.

(56) References Cited

U.S. PATENT DOCUMENTS

| 6,422,076 | B1 | 7/2002 | Prokofiev et al. | |
| 2003/0188578 | A1 | 10/2003 | Ando | |
| 2006/0123904 | A1* | 6/2006 | Dwyer | 73/493 |

FOREIGN PATENT DOCUMENTS

| JP | 61-259174 | 11/1986 |
| JP | 64-012273 | 1/1989 |
| JP | 05-240641 | 9/1993 |
| JP | 08-114620 | 5/1996 |
| JP | 08-292208 | 11/1996 |
| JP | 11-281670 | 10/1999 |
| JP | 2002-311046 | 10/2002 |
| JP | 2003-302420 | 10/2003 |

OTHER PUBLICATIONS

EP Extended Search Report, Dec. 5, 2008, Japan Aviation Electronic.
Office Action for counterpart Japanese application No. 2007-202478, issued on Dec. 11, 2009.
Final office action dated Mar. 9, 2010 for counterpart Japanese patent application No. 2007-202478 with English translation.

* cited by examiner

*Primary Examiner*—John E Chapman
(74) *Attorney, Agent, or Firm*—David N. Lathrop (57) ABSTRACT

In a servo accelerometer, a support rod is formed integrally with a pole piece bottom, which is disposed between a magnetic yoke and a magnet. The support rod is extended to penetrate to the outside through a through-hole formed in a closure plate portion of the magnetic yokes. The sensing mechanism is connected via the support rod to a housing by fixing the support rod at the extended end thereof to the housing. The support rod may be formed integrally with the closure plate portion of the magnetic yoke, rather than the pole piece bottom.

10 Claims, 6 Drawing Sheets

PRIOR ART

PRIOR ART

FIG. 6

SERVO ACCELEROMETER

TECHNICAL FIELD

The present invention relates to a servo accelerometer which has a torque coil attached to a pendulum and in which the pendulum is brought into equilibrium at a neutral point by the action of an electromagnetic force produced by the torque coil supplied with a electric current produced according to the displacement (the amount of swing) of the pendulum in response to input of an acceleration.

BACKGROUND ART

Figure 4:
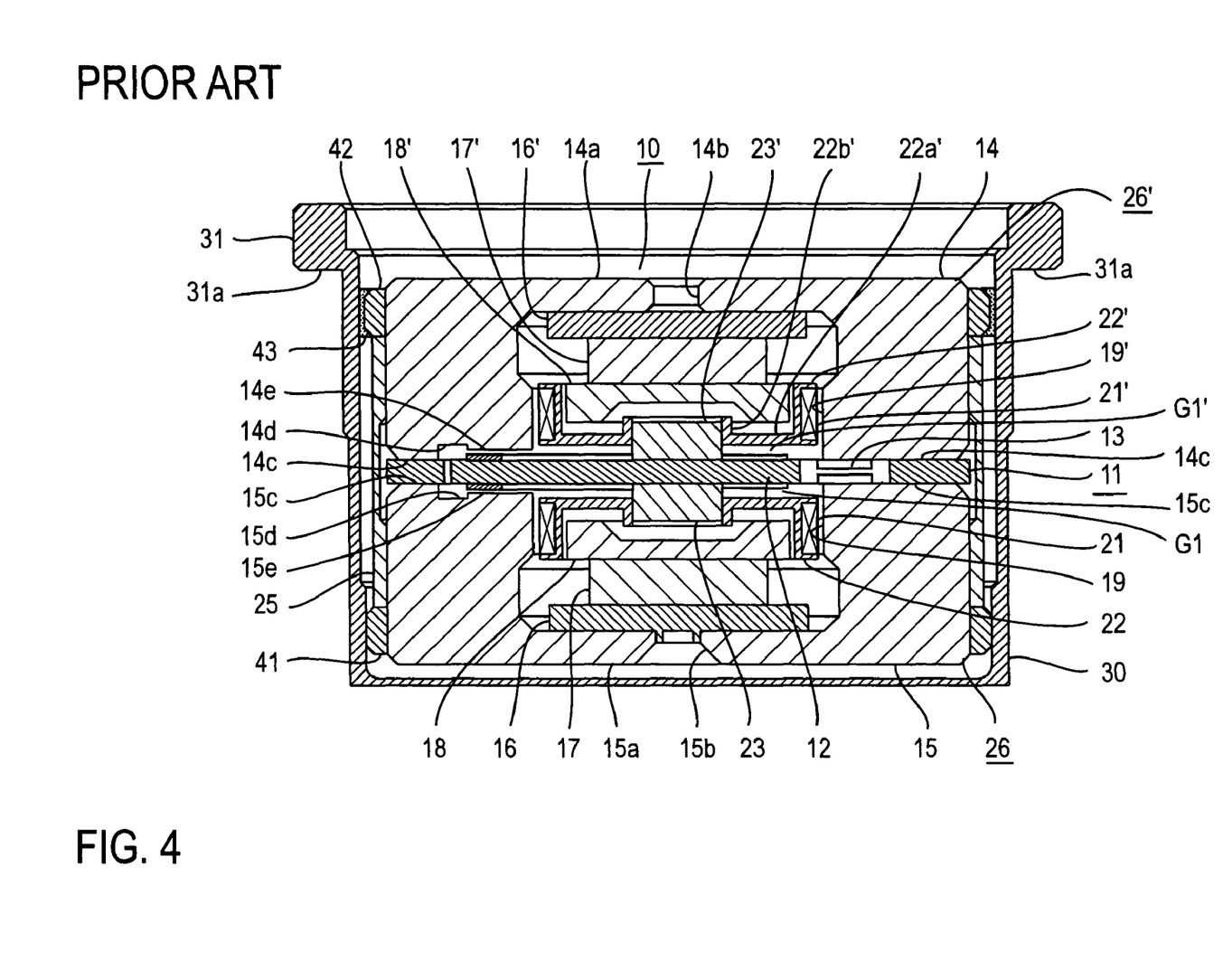
FIG. 4 is a cross-sectional view showing a configuration of a conventional servo accelerometer.

FIG. 4 shows a configuration of a conventional servo accelerometer of this type (for example, reference 1: Japanese Patent Application Laid-Open No. H11-281670), and FIG. 5 show a configuration of a pendulum part 11 of the servo accelerometer.

Figure 5A:
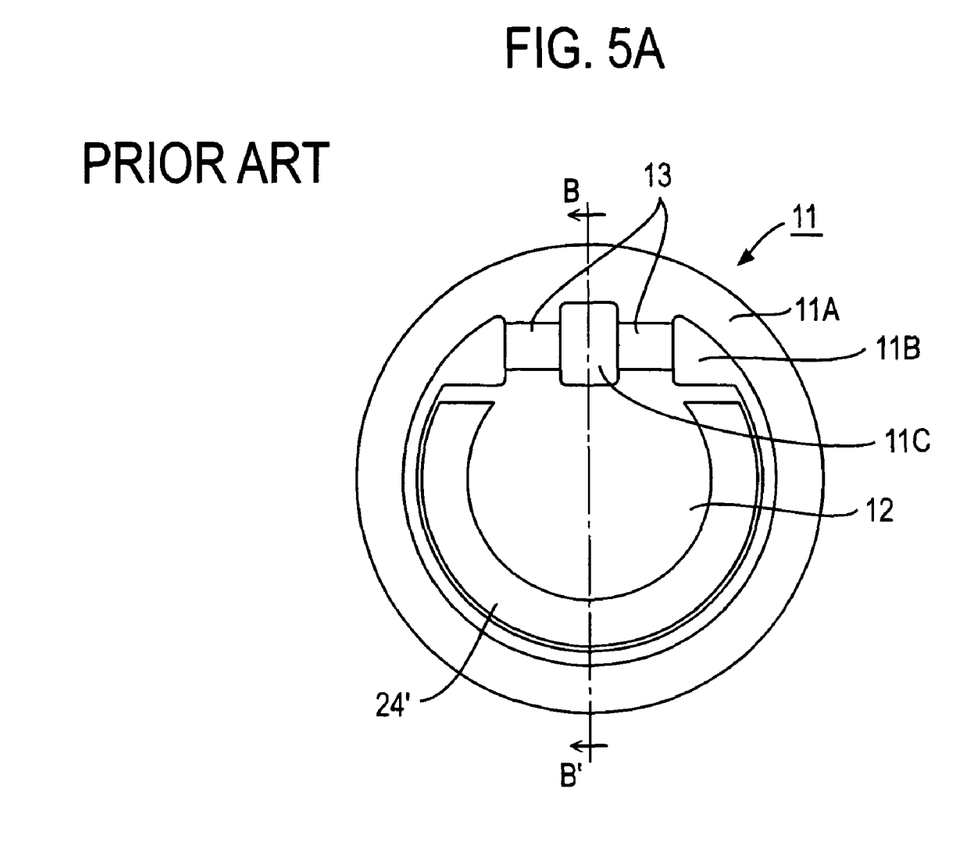
FIG. 5A is a plan view of a pendulum part shown in FIG. 4.
Figure 5B:
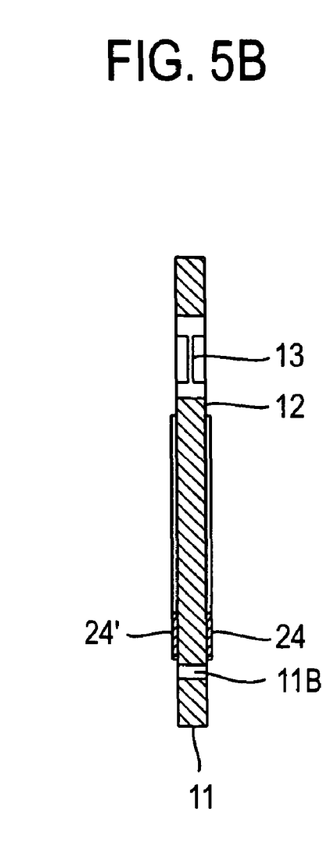
FIG. 5B is a cross-sectional view taken along the line B-B' in FIG. 5A.

As shown in FIG. 5, a circular pendulum part 11 is composed of a frame body 11A having a substantially annular shape, notches 11B and 11C, pendulum 12 having a substantially circular and/or tongue-like shape and a diameter smaller than the inner diameter of the frame body 11A, and a pair of hinges 13 that connect the pendulum 12 and the frame body 11A to each other and support the pendulum 12 in the frame body 11A in such a manner that the pendulum 12 can swing in the thickness direction thereof. The frame body 11A, the pendulum 12 and the hinges 13 are integrally formed of quartz, for example, to constitute the pendulum part 11. The hinges 13 are thin and can be elastically deformed.

As shown in FIG. 4, the pendulum part 11 is interposed between a pair of magnetic yokes 14, 15, and the opposite surfaces of the frame body 11A of the pendulum part 1 abut on the magnetic yokes 14, 15, respectively. Both the magnetic yokes 14, 15 have the shape of a circular cup having one end open and the other end closed, and open ends 14c and 15c thereof abut on the frame body 11A. The magnetic yokes 14, 15 and the pendulum part 11 are fixed to each other by adhesive. The magnetic yokes 14, 15 are made of a metal material, such as Invar, which has a low coefficient of thermal expansion, for example.

The magnetic yokes 14, 15 house pole piece bottoms 16', 16, permanent magnets 17', 17 and pole piece tops 18', 18, respectively. The pole piece bottoms 16', 16, the permanent magnets 17', 17 and the pole piece tops 18', 18 have a disk-like shape and are successively stacked on closure plate portions 14a, 15a of the magnetic yokes 14, 15, which constitute the closed ends of the magnetic yokes 14, 15, respectively, with the center axis thereof aligned with the center axis of the magnetic yokes 14, 15. The pole piece tops 18', 18 have a thickened peripheral edge, as shown in FIG. 4.

The permanent magnets 17', 17 may be rare-earth cobalt magnets, such as samarium cobalt magnet. The pole piece bottoms 16', 16 and the pole piece tops 18', 18 may be made of electromagnetic soft iron. The permanent magnets 17', 17 are fixed to the pole piece bottoms 16', 16 and the pole piece tops 18', 18 by adhesive. The pole piece bottoms 16', 16 are fixed to the magnetic yokes 14, 15, respectively, by laser welding. In FIG. 4, reference numerals 14b, 15b denote through-holes formed in the closure plate portions 14a, 15a, respectively, for the purpose of laser welding.

The permanent magnets 17', 17 are magnetized in the thickness direction thereof and form annular magnetic gaps 19', 19 between the inner surface of the open end of the magnetic yokes 14, 15 and the outer surface of the pole piece tops 18', 18, respectively.

The magnetic yokes 14, 15 and the pole piece bottoms 16', 16, the permanent magnets 17', 17 and the pole piece tops 18', 18 housed in the magnetic yokes 14, 15 constitute yoke parts 26', 26, respectively.

Cylindrical torque coils 21', 21 are attached to the opposite surfaces of the pendulum 12. The torque coils 21', 21 are wound around bobbins 22', 22. The bobbins 22', 22 have end plates 22a', 22a at the end closer to the pendulum 12, and cylindrical attachment parts 22b', 22b are formed at the center of the end plates 22a', 22a.

The bobbins 22', 22 with the torque coils 21', 21 wound therearound are attached to the pendulum 12 by fixing cylindrical holders 23', 23 to the opposite surfaces of the pendulum 12 by adhesive, fitting the attachment parts 22b', 22b of the bobbins 22', 22 into the holders 23', 23, and fixing the attachment parts 22b', 22 to the holders 23', 23, respectively, by adhesive. As shown in FIG. 4, small gaps G1', G1 are formed between the end plates 22a, 22a of the bobbins 22', 22 and the opposite surfaces of the pendulum 12. As with the pendulum 12, the holders 23', 23 are made of quartz.

Figure 6:
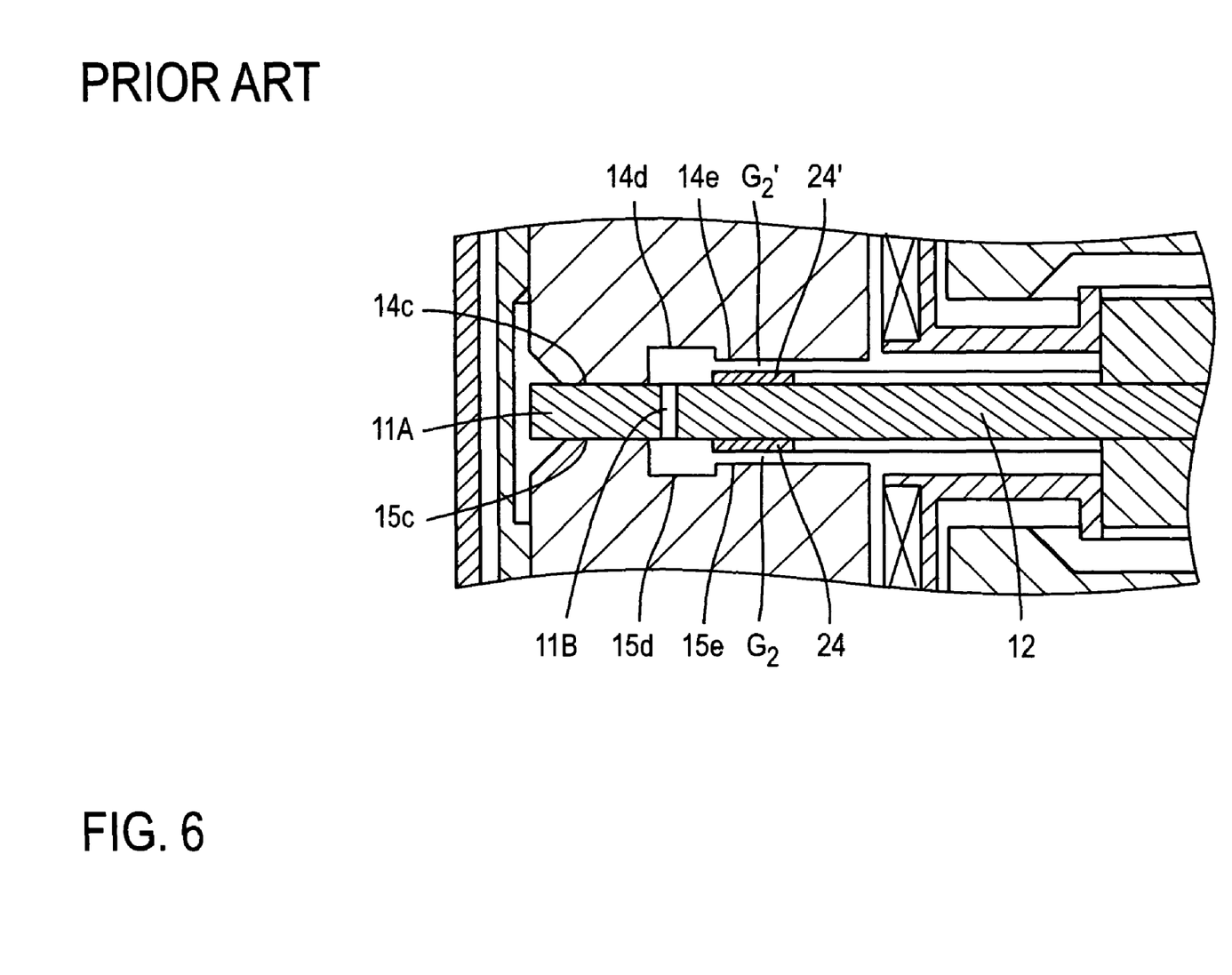
FIG. 6 is a partial cross-sectional view showing the configuration of the conventional servo accelerometer.

As shown in FIGS. 5, on the opposite surfaces of the pendulum 12, arc-shaped electrodes 24', 24 are disposed at a position on the outer side of the torque coils 21', 21. The magnetic yokes 14, 15 have electrode surfaces 14e, 15e that face the electrodes 24', 24, respectively. Thus, As shown in FIG. 6, the surfaces of the open ends of the magnetic yokes 14, 15 include frame body abutting surfaces 14c, 15c, recesses 14d, 15d, and the electrode surfaces 14e, 15e facing the areas of the pendulum 12 where the electrodes 24', 24 are formed, respectively, arranged in this order from the outer periphery thereof.

The frame body abutting surfaces 14c, 15c of the magnetic yokes 14, 15 are adhered to the opposite surfaces of the frame body 11A of the pendulum part 11 to sandwich the pendulum part 11, so that a single piece of body of the sensing mechanism 10 is obtained. In other words, the yoke parts 26', 26 and the pendulum part 11 are integrated. Once these components are integrated, the cylindrical torque coils 21', 21 are disposed in the annular magnetic gaps 19', 19 in the magnetic yokes 14, 15, respectively. Furthermore, the electrode surfaces 14e, 15e face the electrodes 24', 24 with predetermined gaps G2', G2 interposed therebetween, respectively.

An outer ring 25 is mounted astride the outer surfaces of the magnetic yokes 14, 15 and makes the magnetic yokes 14, 15 electrically continuous. As with the magnetic yokes 14, 15, the outer ring 25 is made of Invar and fixed to the magnetic yokes 14, 15 by a conductive adhesive. In this way, the integral sensing mechanism 10 is provided and housed in a housing 30.

The housing 30 protects the sensing mechanism 10, serves an acceleration detection function and serves as an attachment mechanism for attachment to a target object for acceleration detection (a moving object). In this example, the housing 30 has the shape of a cylindrical cup with one end closed. The housing 30 has a flange 31 for attachment at the open end thereof, and a side surface (lower surface) of the flange 31 serves as an attachment surface 31a. The housing 30 is made of a stainless material, for example.

A C-ring 41 is fitted around the magnetic yoke 15, and the sensing mechanism 10 is fixed to and supported on the housing 30 via the C-ring 41. The C-ring 41 is fixed to the magnetic yoke 15 and the housing 30 by adhesive.

Similarly, a C-ring 42 is fitted around the magnetic yoke 14 and fixed to the magnetic yoke 14 by adhesive. A space between the C-ring 42 and the housing 30 is filled with a flexible adhesive 43 of silicone resin or the like. The C-rings 41, 42 are disposed to stable the sensing mechanism 10. The C-rings 41, 42 are both made of aluminum. To protect the inner components, the open end of the housing 30 may be appropriately covered with a lid plate.

The servo accelerometer thus configured detects a displacement of the pendulum 12 in the thickness direction caused by input of acceleration as a variation in capacitance, which results from a variation of the gap G2' between the electrode 24 and the electrode surface 14e or the gap G2 between the electrode 24' and the electrode surface 15e (no electric signal paths are shown). The electrode surfaces 14e, 15e are connected to common GND, detection signals from the electrodes 24', 24 on the opposite surfaces of the pendulum 12 are differentially amplified by a required electrical circuit (not shown), and an electric current produced according to the difference in capacitance is supplied to the pair of torque coils 21', 21. Interaction between the electric current flowing through the torque coils 21', 21 and the magnetic field of the permanent magnets 17', 17 causes the pendulum 12 to return to the original position and come into equilibrium at the neutral point. Because the electric current is proportional to the acceleration applied to the pendulum 12, the acceleration can be determined from the electric current.

In the conventional servo accelerometer configured as described above, the sensing mechanism 10 is fixed to and supported on the housing 30 via the C-rings 41, 42 fitted around and fixed by adhesive to the magnetic yokes 14, 15.

Thus, for example, if a stress is exerted on the attachment surface 31a of the housing 30 from a target structure (a target object for acceleration detection) because of a variation in ambient temperature, for example, the stress causes deformation of the magnetic yokes 14, 15. In addition, if a thermal stress occurs in the housing 30, the stress is transferred to the magnetic yokes 14, 15 through the C-rings 41, 42 to cause deformation of the magnetic yokes 14, 15.

Such deformation of the magnetic yokes 14, 15 results in displacement of the pendulum 12 from the neutral position, thereby causing a variation in bias. Thus, the bias stability is degraded.

In the process of transfer of the stress from the housing 30 to the magnetic yokes 14, 15 via the C-rings 41, 42, an excessive stress is exerted on the adhesive layer between the housing 30 and the C-rings 41, 42 and the adhesive layer between the C-rings 41, 42 and the magnetic yokes 14, 15. In addition, the deformation of the magnetic yokes 14, 15 causes an excessive stress exerted on the adhesive layer between the magnetic yokes 14, 15 and the frame 11 supporting the pendulum 12. As a result, cracking or peel-off of these adhesive layers occurs.

Such cracking or peel-off of these adhesive layers leads to a variation in stress distribution in the sensing mechanism 10, which is a major cause of an irreversible bias variation in an environment where the temperature varies.

In view of such circumstances, an object of the present invention is to provide a servo accelerometer that achieves a high bias stability, is reduced in number of causes of an irreversible bias variation, and has excellent temperature characteristics.

SUMMARY OF THE INVENTION

Disadvantages of the prior art are caused by the C-rings disposed on the outer periphery of the magnetic yokes to fix the magnetic yokes to the housing. Thus, according to the present invention, a sensing mechanism is connected to a housing via one support rod formed on the sensing mechanism. More specifically, for example, a support rod is formed integrally with a pole piece bottom or a magnetic yoke. More desirably, the support rod is formed of the same material as, and integrally with, the pole piece bottom or the magnetic yoke. Since the sensing mechanism is connected to the housing via the support rod, an external stress is less likely to be transferred to the sensing mechanism. As a result, the bias of the servo accelerometer is stabilized.

BEST MODES FOR CARRYING OUT THE INVENTION

Figure 1:
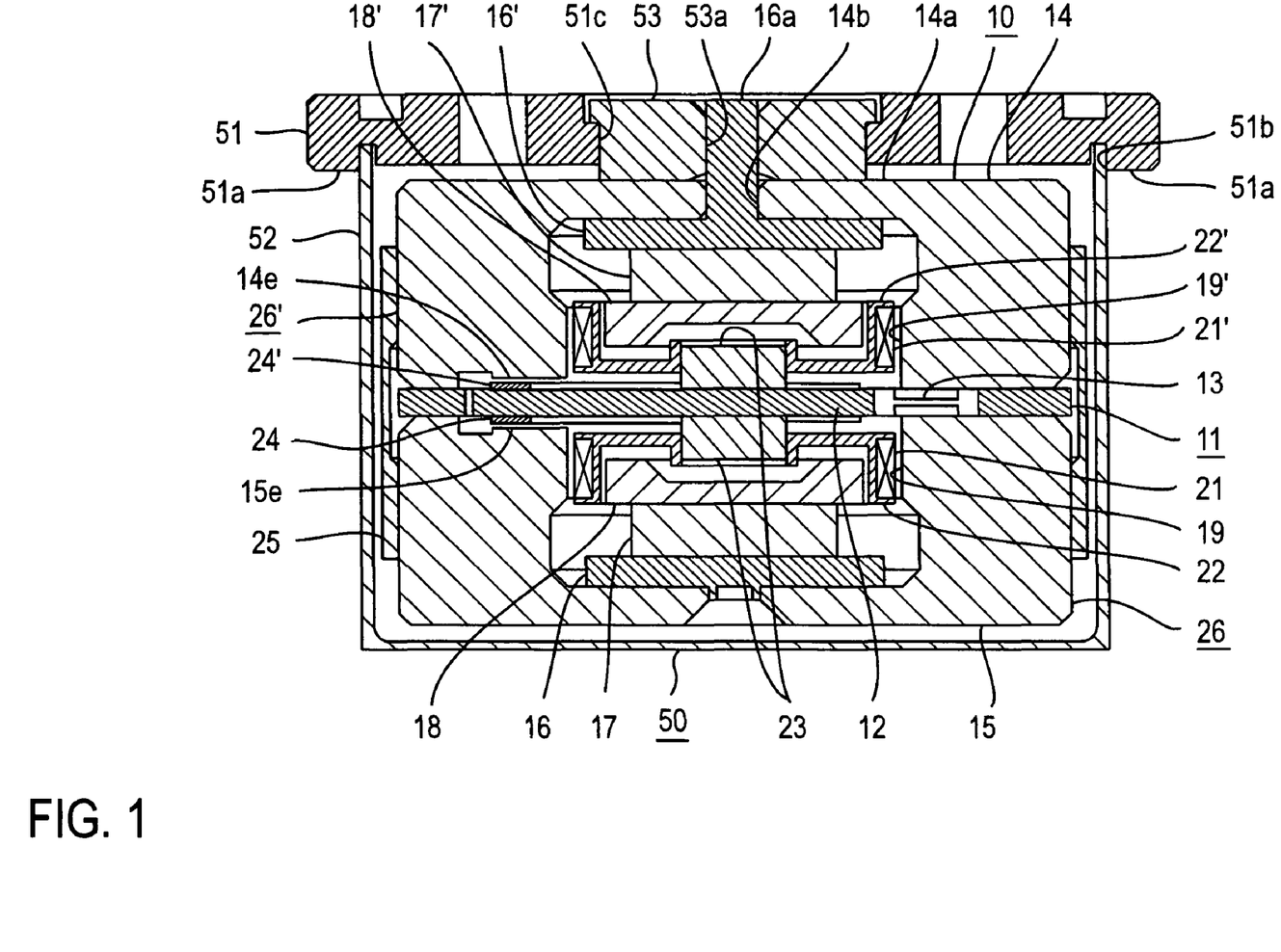
FIG. 1 is a cross-sectional view showing a configuration of a servo accelerometer according to an embodiment of the present invention.

Embodiments of the present invention will be described with reference to the drawings. FIG. 1 is a diagram showing a configuration of a servo accelerometer according to an embodiment of the present invention. Parts corresponding to those in FIG. 4 are denoted by the same reference numerals, and detailed descriptions thereof will be omitted.

In this embodiment, a sensing mechanism 10 is fixed to and supported on a housing via one support rod 16a formed on a pole piece bottom 16', unlike the example of the prior art in which the sensing mechanism 10 is fixed to and supported on the housing via the C-ring 41 as shown in FIG. 4.

A housing 50, which houses and protects the sensing mechanism 10 and serves also as an attachment mechanism for attachment to a target structure (a target object for acceleration detection), is composed of a plate 51 and a cover 52 in this embodiment. In this embodiment, the sensing mechanism 10 is attached to the plate 51.

The cover 52 has the shape of a cylindrical cup having one end open and the other end closed. The plate 51 is attached to the open end to cover the open end.

The plate 51 and the cover 52 are made of a stainless material, for example. The plate 51 has a ring-shaped groove 51b formed therein, and the plate 51 and the cover 52 are integrated by fitting the open end edge of the cover 52 into the groove 51b and welding the edge to the groove. The lower surface of the flange-like part of the plate 51 that protrudes outwardly from the cover 52 serves as an attachment surface 51 a as shown in FIG. 1. Thus, according to the present invention, the sensing mechanism 10 and the plate 51 are integrated, and the cover 52 is simply placed over the sensing mechanism 10 for the purpose of protection. Thus, there is no mechanical contact between the cover 52 and the sensing mechanism 10.

The support rod 16a for fixing the sensing mechanism 10 to the housing 50 is formed integrally with the pole piece bottom 16' housed in and fixed to a magnetic yoke 14. The support rod 16a has a cylindrical shape and protrudes to the outside of the magnetic yoke 14 by passing through a through-hole 14b formed in a closure plate portion 14a of the magnetic yoke 14. The center axis of the support rod 16a is aligned with the center axis of the magnetic yoke 14, which has a cylindrical shape. The pole piece bottom 16' and the magnetic yoke 14 are fixed to each other by laser welding, as in the example of the prior art. In this embodiment, the peripheral surface of the support rod 16a is welded to the magnetic yoke 14 along the outer C-chamfered edge of the through-hole 14b.

In this embodiment, a bushing 53 is attached to the plate 51. The support rod 16a is attached to the plate 51 via the bushing 53. In FIG. 1, reference numeral 51c denotes a through-hole formed in the plate 51 for attachment of the bushing 53, and reference numeral 53a denotes a through-hole in the bushing 53 into which the support rod 16a is to be inserted.

The bushing 53 is made of an insulating material in order that the sensing mechanism 10 and the plate 51 (the housing 50) are electrically insulated from each other. For example, the bushing 53 is made of ceramic. The bushing 53 is fixed to the plate 51 by adhesive, and the support rod 16a and the bushing 53 are also fixed to each other by bonding the opposed surfaces thereof to each other by adhesive in this embodiment.

In the servo accelerometer configured as described above, the sensing mechanism 10 has one support rod 16a that extends on the center axis thereof and protrudes to the outside and is fixed to the housing 50 only by the support rod 16a. Therefore, the sensing mechanism is, or more specifically, the magnetic yokes 14, 15 are mechanically independent of the housing 50.

Thus, even if a stress is exerted on the attachment surface 51a of the plate 51 of the housing 50 from the target structure (the target object for acceleration detection) because of a variation in ambient temperature or a thermal stress occurs in the housing 50, for example, the stress causes only deformation of the housing 50 and is not transferred to the sensing mechanism 10. Thus, the sensing mechanism 10 is prevented from being deformed by the action of an external stress.

According to this embodiment, unlike the prior art, an external stress does not cause deformation of the magnetic yokes 14, 15, so that a pendulum 12 is not displaced from the neutral position, and a bias variation does not occur. Thus, a high bias stability can be achieved.

Furthermore, since the configuration described above is adopted in this embodiment, the C-rings 41, 42, which have been conventionally used to fix and support the sensing mechanism 10, are not necessary. In other words, the adhesive layers between the C-rings 41, 42 and the sensing mechanism 10 and between the C-rings 41, 42 and the housing 30 can be omitted. Thus, the number of adhesive layers, which crack or peel off due to a stress to cause an irreversible bias variation, can be reduced accordingly.

In addition, the support mechanism for the sensing mechanism 10 described above does not exert a high stress on adhesive layers between a frame 11 supporting the pendulum 12 and the magnetic yokes 14, 15, and thus, cracking or peel-off of these adhesive layers does not occur. This also contributes to suppression of occurrence of an irreversible bias variation.

The following are results of analysis of the bias stability and the bias variation irreversibility for the conventional configuration shown in FIG. 4 and the configuration according to this embodiment of the present invention shown in FIG. 1. The bias stability is evaluated in terms of bias temperature coefficient, which is a pseudo output produced in response to a temperature variation when the input acceleration equals to 0. As for the bias variation irreversibility, the possibility of occurrence of an irreversible bias variation is estimated from the shearing stress exerted (occurring) on the adhesive surface of the frame 11 supporting the pendulum 12 due to a temperature variation.

<Analysis Results>
(1) Bias temperature coefficient
Prior art: 17 μG/° C.→Embodiment: 3 μG/° C.
(2) Shearing stress exerted on adhesive surface (Temperature variation: 175° C. (from 25° C. to 200° C.))
Upper surface of frame 11 (on the side of magnetic yoke 14)
Prior art: 5 Mpa→Embodiment: 1 Mpa
Lower surface of frame 11 (on the side of magnetic yoke 15)
Prior art: 9 Mpa→Embodiment: 0.5 Mpa As shown above, the results are improved in this embodiment compared with the prior art. In the item (2), the shearing stress significantly differs between the upper and lower surfaces of the frame 11 particularly in the prior art. This difference is probably due to the difference in the degree of fixing by the upper and lower rings (rings 41, 42).

As for the relationship between the shearing stress shown in the item (2) and the strength of the adhesive, for example, an epoxy adhesive available at high temperature has a shearing strength of about 7 Mpa at 200° C. While the shearing stress exerted on the adhesive (adhesive layer) is sufficiently small compared with the shearing strength of the adhesive in the embodiment, the shearing stress exerted on the adhesive is greater than the shearing strength in the prior art. Therefore, cracking or peel-off of the adhesive layer, which causes an irreversible bias variation, can occur.

The support rod 16a does not need to be fixed to the bushing 53 by adhesive and may be fixed thereto by caulking. If caulking is adopted, the workability can be improved. The adhesive approach and the caulking approach may be used in combination.

Figure 2:
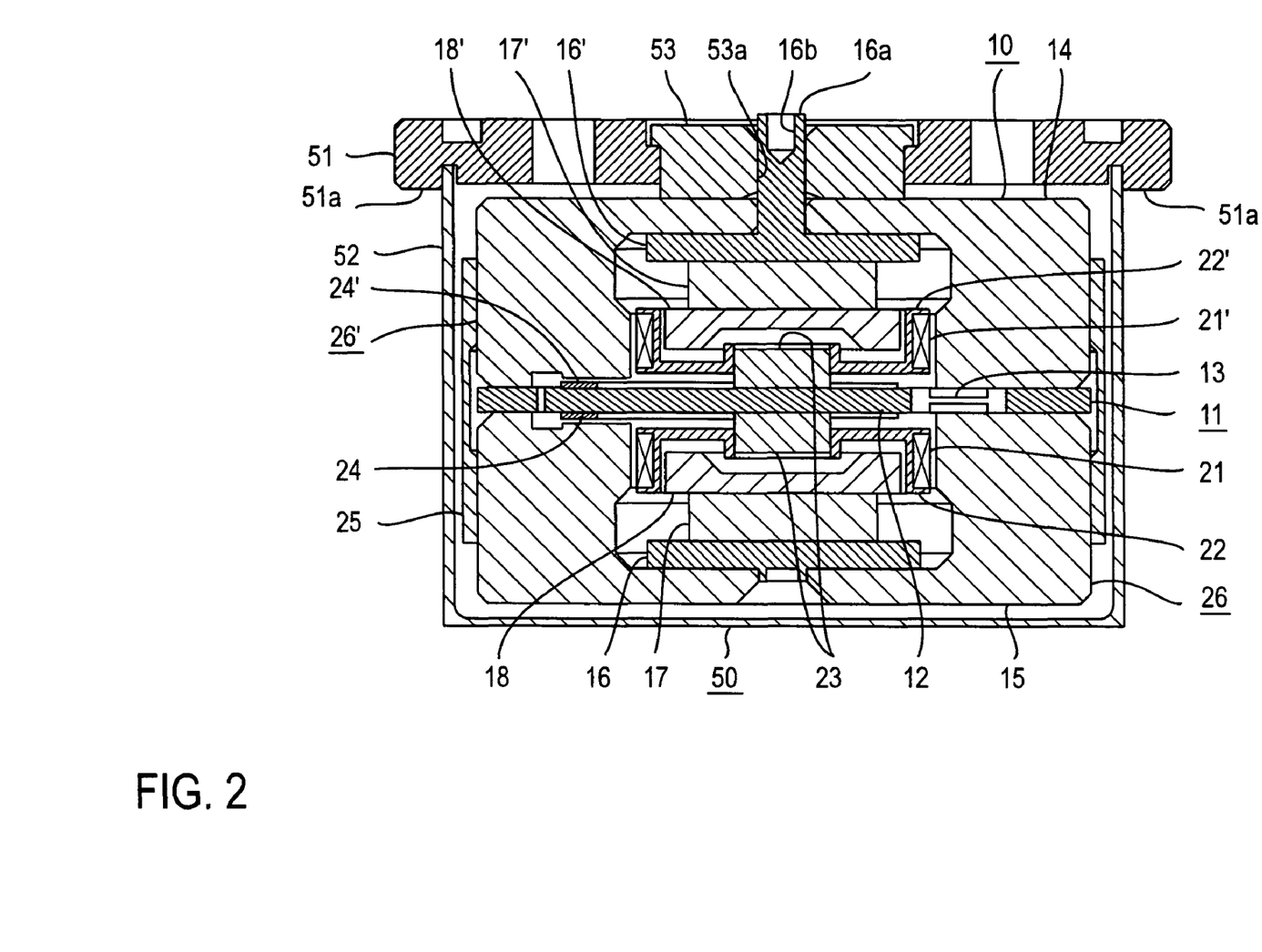
FIG. 2 is a cross-sectional view showing a configuration of a servo accelerometer according to another embodiment of the present invention.

FIG. 2 is a diagram showing a configuration of a servo accelerometer according to another embodiment of the present invention. The same parts as those shown in FIG. 1 are denoted by the same reference numerals, and detailed descriptions thereof will be omitted. In this embodiment, a support rod 16a is fixed to a bushing 53 by caulking. The configuration shown in FIG. 2 is one before caulking is carried out. In the tip end face of the support rod 16a, there is formed a hole 16b into which a punch for caulking is to be inserted. The support rod 16a has such a dimension (length) that the support rod 16a slightly protrudes from the bushing 53.

Figure 3:
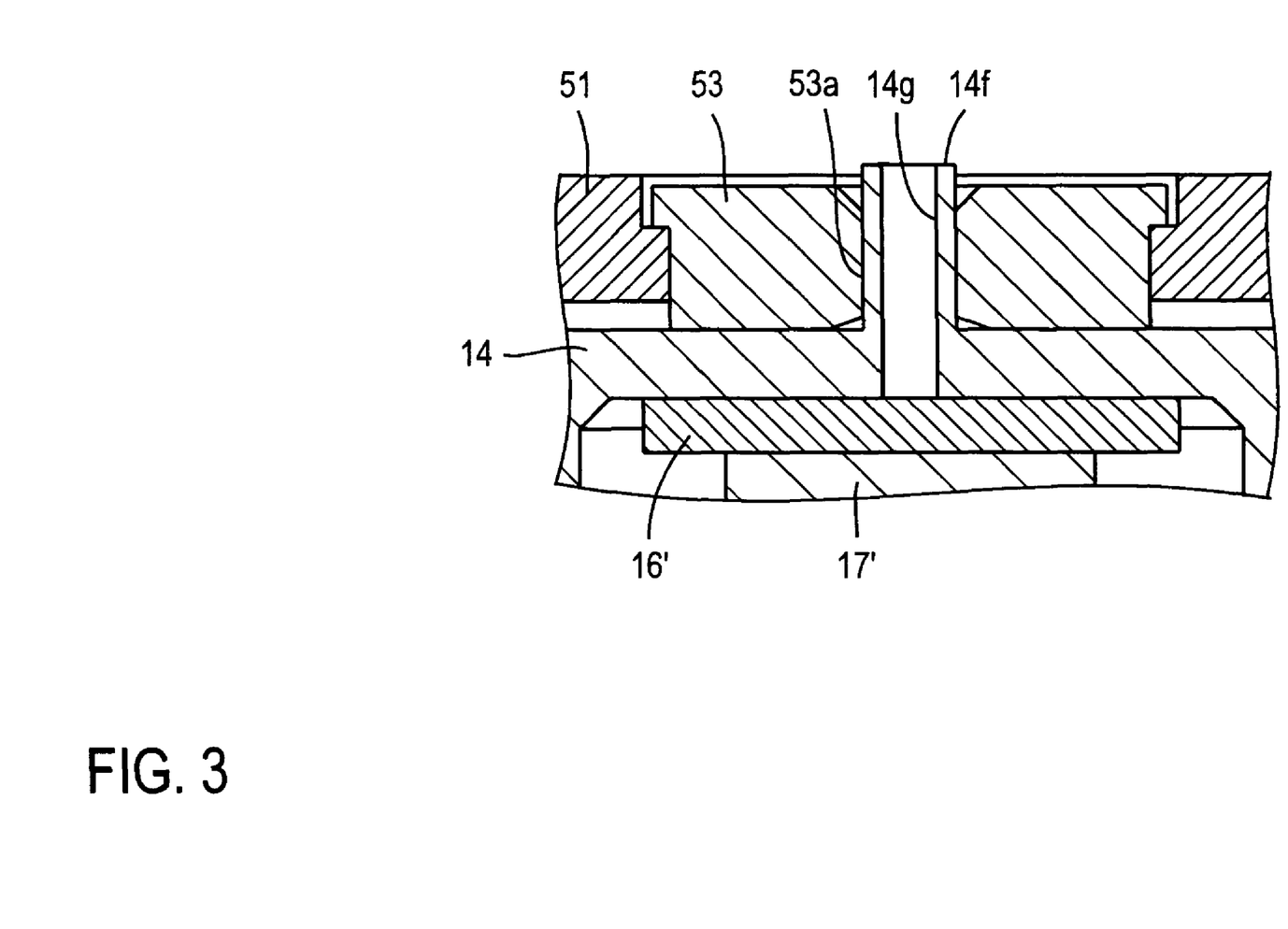
FIG. 3 is a partial cross-sectional view showing a configuration of a servo accelerometer according to another embodiment of the present invention.

FIG. 3 is a diagram showing a configuration of a servo accelerometer according to another embodiment of the present invention. The same parts as those shown in FIG. 1 are denoted by the same reference numerals, and detailed descriptions thereof will be omitted. In this embodiment, a support rod 14f is formed integrally with a magnetic yoke 14. Specifically, the support rod 14f is formed integrally with a closure plate portion 14a of the magnetic yoke 14 in such a manner that the center axis of the support rod 14f agrees with the center axis of the magnetic yoke 14. In this embodiment, the support rod 14f has the shape of a hollow cylinder and has a through-hole 14g to pass a laser beam for welding the magnetic yoke 14 and a pole piece bottom 16' to each other.

The servo accelerometer shown in FIG. 3 is different from the servo accelerometers according to the embodiments shown in FIGS. 1 and 2 in that the support rod 14f is formed integrally with the magnetic yoke 14 but similar thereto in the other respects. For example, as in the embodiments described above, the support rod 14f and a bushing 53 are fixed to each other by adhesive and/or caulking.

In the case where the support rod 14f and the magnetic yoke 14 are formed integrally, the support rod 14f does not always need to have a hollow structure, although the support rod 14f has been described above as a hollow structure. Specifically, similarly to the support rod 16a shown in FIG. 1, the support rod 14f may have a flat tip end face. Alternatively, similarly to the support rod 16a shown in FIG. 2, a hole 16b into which a punch for caulking is to be inserted may be formed in the tip end face of the support rod 14f. In these cases, since there is not the through-hole 14g for passing the welding beam, the magnetic yoke 14 and the pole piece bottom 16' cannot be welded to each other. Thus, the magnetic yoke 14 and the pole piece bottom 16' are fixed to each other by adhesive. In the case where the support rod 14f does not have a hollow structure, as in the cases described above, the support rod 14f and the bushing 53 are fixed to each other by adhesive and/or caulking.

In the embodiments described above, the support rod 16a or 14f is formed of the same material as, and integrally with, the pole piece bottom 16' or the magnetic yoke 14, respectively. However, the support rod 16a or 14f may be formed of a different material than the pole piece bottom 16' or the magnetic yoke 14, respectively, and be integrated with the pole piece bottom 16' or the magnetic yoke 14, respectively, by adhesive or welding.

In this way, for example, by forming the support rod 16a or 14f on the pole piece bottom 16' or the magnetic yoke 14, the support rod 14f or 16a for the sensing mechanism 10 is provided.

In the embodiments described above, the bushing 53 made of an insulating material is attached to the plate 51, thereby insulating the sensing mechanism 10 and the plate 51 (housing 50) from each other. However, the insulation can be achieved without using the bushing 53. To this end, for example, an insulating layer (an insulating film) can be formed on the periphery of the support rod 16a, 14f.

In the embodiments described above, the support rod 16a, 14f is formed in such a manner that the center axis thereof agrees with the center axis of the magnetic yoke 14 having the shape of a cylindrical cup. This is because, if the support rod 16a, 14f is formed along the center axis of the magnetic yoke 14, a irreversible bias variation, which can be caused by a thermal stress in the magnetic yoke 14, can be minimized. However, the center axis of the support rod 16a, 14f may not agree with the center axis of the magnetic yoke 14 having the shape of a cylindrical cup.

The present invention can be equally applied to various servo accelerometers having shapes other than the cylindrical shape. That is, for example, for a servo accelerometer whose housing 50 and magnetic yokes 14, 15 don't have the shape of a cylindrical cup, whose pendulum part 11 and pendulum 12 are not circular, and whose torque coil 21 is not cylindrical, for example, a servo accelerometer having the shape of a rectangular parallelepiped, the same advantages as described above can be achieved by fixing the sensing mechanism 10 to the housing 50 via one support rod 16a, 14f.

The through-hole 53a for passing the support rod 16a, 14f for fixing and supporting the sensing mechanism 10 can be formed at any position on the housing 50. For example, the through-hole 53a can be formed in the bottom of the cover 52 of the housing 50, that is, the part of the cover 52 of the housing 50 that is located opposite the plate 51, and the support rod 16a, 14f can be placed in the through-hole 53a. In this case also, as in the embodiments described above, the sensing mechanism 10 and the housing 50 are insulated from each other by the bushing 53 or an insulating layer formed on the periphery of the support rod 16a, 14f.

EFFECTS OF THE INVENTION

According to the present invention, since the sensing mechanism is fixed to and supported on the housing via only one support rod formed integrally with the sensing mechanism, an external stress caused by a variation in ambient temperature or the like can be prevented from being transferred to the sensing mechanism. Thus, unlike the prior art, deformation of the magnetic yokes, which causes displacement of the pendulum from the neutral position thereof, does not occur, and a high bias stability is achieved.

Furthermore, the C-rings conventionally used for fixing and supporting the sensing mechanism are not necessary, and the adhesive layers between the C-rings and the sensing mechanism and between the C-rings and the housing can be omitted. As a result, cracking or peel-off of adhesive layers caused by a stress can be avoided accordingly, and the number of causes of an irreversible bias variation can also be reduced accordingly.

In this way, the present invention provides a servo accelerometer with improved temperature characteristics.

What is claimed is:

1. A servo accelerometer comprising:
   a sensing mechanism having a pair of yoke parts and a pendulum part including a pendulum; and
   a housing for housing the sensing mechanism;
   the sensing mechanism detecting an acceleration based on a swing position of the pendulum from a neutral position between the pair of yoke parts and causing the pendulum to return to the neutral position by electromagnetic action of an electric current generated according to the swing movement of the pendulum,
   wherein the sensing mechanism has a single support rod formed integrally therewith and extended therefrom and
   the sensing mechanism is connected via the rod to the housing by fixing the rod at an extended end thereof to the housing.

2. The servo accelerometer according to claim 1, in which each of the yoke parts comprises:
   a cup-shaped magnetic yoke having one end open and the other end closed by a closure plate portion thereof; and
   a pole piece bottom, a permanent magnet and a pole piece top which are stacked successively to each other and set on the closure plate portion at the inside of the yoke;
   the pole piece top and the open end of the yoke are disposed to oppose to each other having a magnetic gap space therebetween;
   the pendulum part comprises:
   a frame body;
   the pendulum formed in a shape of plate and having a pair of electrodes on opposite surfaces thereof, and swingably sustained at one end thereof via a hinge to the frame body; and
   a pair of torque coils fixed on the surfaces of the pendulum;
   the pair of magnetic yokes are connected together with the frame body sandwiched between the open ends of the pair of magnetic yokes in a manner such that
      the pair of torque coils are placed in the magnetic gap spaces of the respective magnetic yokes, respectively, and
      the pair of electrodes are opposed to electrode surfaces of the open end of the pair of magnetic yokes, respectively, so that a single piece of body of the sensing mechanism is obtained,
   wherein the support rod is formed integrally with the pole piece bottom of one of the pair of yoke parts, and extended to penetrate toward outside through a through-hole formed in the closure plate portion of the magnetic yoke of the one yoke part.

3. The servo accelerometer according to claim 1, in which each of the yoke parts comprises:
- a cup-shaped magnetic yoke having one end open and the other end closed by a closure plate portion thereof; and
- a pole piece bottom, a permanent magnet and a pole piece top which are stacked successively to each other and set on the closure plate portion at the inside of the yoke;
- the pole piece top and the open end of the yoke are disposed to oppose to each other having a magnetic gap space therebetween;

the pendulum part comprises:
- a frame body;
- the pendulum formed in a shape of plate and having a pair of electrodes on opposite surfaces thereof, and swingably sustained at one end thereof via a hinge to the frame body; and
- a pair of torque coils fixed on the surfaces of the pendulum;

the pair of magnetic yokes are connected together with the frame body sandwiched between the open ends of the pair of magnetic yokes in a manner such that
- the pair of torque coils are placed in the magnetic gap spaces of the respective magnetic yokes, respectively, and
- the pair of electrodes are opposed to electrode surfaces of the open end of the pair of magnetic yokes, respectively, so that a single piece of body of the sensing mechanism is obtained, wherein the support rod is formed integrally with one of the magnetic yokes at the closure plate portion of the magnetic yoke.

4. The servo accelerometer according to any one of claims 1 to 3, wherein each of the magnetic yokes has the shape of a cylindrical cup, and the support rod is positioned along a center axis of the magnetic yokes.

5. The servo accelerometer according to any one of claims 1 to 3, wherein the housing has a through-hole, and the support rod is inserted into the through-hole and fixed thereto by adhesive.

6. The servo accelerometer according to any one of claims 1 to 3, wherein the housing has a through-hole, and the support rod is inserted into the through-hole and fixed thereto by caulking.

7. The servo accelerometer according to claim 5, wherein the housing and the support rod are insulated from each other by a bushing made of an insulating material and inserted therebetween.

8. The servo accelerometer according to claim 6, wherein the housing and the support rod are insulated from each other by a bushing made of an insulating material and inserted therebetween.

9. The servo accelerometer according to claim 7, wherein the bushing is made of ceramic.

10. The servo accelerometer according to claim 8, wherein the bushing is made of ceramic.

* * * * *